United States Patent [19]

Polaert et al.

[11] 4,025,328

[45] May 24, 1977

[54] METHOD OF MANUFACTURING MICROCHANNEL PLATE HAVING ROUNDED INPUT FACES

[75] Inventors: Remy Henri Francois Polaert, Villecresnes; Alphonse Ducarre, Ste Genevieve des Bois; Valere Dominique Louis Duchenois, Paris; Jean Rodiere, Saint-Maur, all of France

[73] Assignee: U.S. Philips Corporation, New York, N.Y.

[22] Filed: June 25, 1975

[21] Appl. No.: 590,317

[30] Foreign Application Priority Data

July 3, 1974 France ............................ 74.23128

[52] U.S. Cl. .................................. 65/111; 65/120; 65/DIG. 4; 65/DIG. 7

[51] Int. Cl.[2] .................. C03B 31/00; C03B 25/00; H01J 39/00

[58] Field of Search ............... 65/111, 120, DIG. 7, 65/DIG. 4; 313/94

[56] References Cited

UNITED STATES PATENTS

| | | | |
|---|---|---|---|
| 2,608,031 | 8/1952 | Barnes et al. | 65/111 X |
| 2,971,294 | 2/1961 | Hohmann et al. | 65/120 |
| 3,051,915 | 8/1962 | Hoover et al. | 65/111 X |
| 3,366,467 | 1/1968 | Ohnishi et al. | 65/111 X |
| 3,395,994 | 8/1968 | Cuff | 65/111 X |
| 3,558,377 | 1/1971 | Tantillo | 65/DIG. 7 |
| 3,724,924 | 4/1973 | Lenfant et al. | 65/DIG. 7 |
| 3,758,197 | 9/1973 | Klang et al. | 65/DIG. 7 |
| 3,811,857 | 5/1974 | Deeg et al. | 65/120 X |

*Primary Examiner*—S. Leon Bashore
*Assistant Examiner*—Frank W. Miga
*Attorney, Agent, or Firm*—Frank R. Trifari; Ronald L. Drumheller

[57] ABSTRACT

A microchannel plate for secondary electron emission intensification, having channel walls which are rounded so as to increase the interception of secondary electrons formed due to the incidence of primary electrons on the ends of the said channel walls.

According to the invention, the method of manufacturing such a channel plate consists of softening the channel wall material and by bombardment of the glass of the input surface by means of an energy-carrying beam of high power for a very short period of time. The glass of the walls at the input surface side then assumes a rounded shape under the influence of gravity and the surface stress of the glass.

4 Claims, 3 Drawing Figures

METHOD OF MANUFACTURING MICROCHANNEL PLATE HAVING ROUNDED INPUT FACES

The invention relates to a microchannel plate, wherein the inner surfaces of the channels are covered with a secondary-emissive material, the channel inputs having conical shape. The invention also relates to a method of manufacturing such a microchannel plate.

Microchannel plates having internal electron emission in the form of thin plane parallel slabs, are known. The channels are usually parallel to each other and connect the principal surfaces or end faces of the microchannel plate to each other. On the end faces the surface area of the combined microchannels amounts to, for example, 67% of the overall surface area, whilst the remaining 33% is occupied by the channel walls.

In a photoelectric device wherein, for example, use is made of an intensifier element in the form of a microchannel plate, part of the primary electrons emitted by the photocathode thus collide at the input of the channel plate with the end faces of the walls of the channels. These electrons have an energy which is sufficient to give rise to the formation of secondary electrons. The preferred orientation of departure of these secondary electrons from the end face is perpendicular to the said surfaces. Consequently, there are numerous electrons which do not make a contribution to the image intensification, i.e. the electrons which disappear in the said direction. As result, the intensification factor of the image intensifier is reduced.

French Patent Specification No. 1,565,868 describes a microchannel plate structure wherein the inputs of the microchannels are broadened such that on the input surface of the plate the walls of the said channels occupy a smaller surface area than in the known microchannel plate structure, thus contributing to the increased interception of the primary electrons and the intensification effect of the plate.

The said French Patent Specification actually does not define a method of manufacturing such a microchannel plate.

The invention has for its object to recover at least part of the electrons which are lost on the input of the known microchannel plates because of the channel walls. These recovered electrons can contribute to the intensification.

To this end, the geometry of the channel walls on the input of the microchannel plate is modified without adversely affecting the homogeneity of the glass structure, but by uniformizing this glass structure at this area, both as regards volume and surface, so as to prevent the appearance of parasitic signals which occur due to field effects appearing when the structure of the glass is modified.

The invention is based on the recognition of the fact that on the output of the microchannel plate the light spot which corresponds to secondary electrons from a channel is always substantially expanded. The said expansion may occur to the transverse dimension of, for example, 15 channels. Therefore, if a secondary electron, caused by a collision with the wall of the relevant channel on the input side of the microchannel plate, is intercepted, due to an inclined movement direction, by a neighboring channel, the said electron will cause a light spot on the output which, as far as the transverse dimension thereof is concerned, is shifted very little with respect to the first spot considered. By stimulating the said interception, the effectiveness of the electronic intensification will be enhanced, without substantial reduction of the resolution.

According to the invention, this is realized by rounding the ends of the channel walls on the input side of the microchannel plate. As a result, perpendicular directions on the said ends correspond to inclined directions with respect to the input surface of the channels: furthermore, the primary electrons which are perpendicularly orientated on the said surface are incident on the rounded end of the walls according to an inclined direction.

The importance of the said characteristics is twofold: on the one hand, in the case of perpendicular collisions of primary electrons, the emission of secondary electrons is thus strongest, the secondary electrons thus formed being readily interceptable by neighbouring channels due to the inclined direction with respect to the input surface, whilst on the other hand the degree of secondary electron emission is increased by the less inclined direction of incidence of the primary electron on the channel wall.

For various applications the invention offers the same advantages when the said microchannel plate is used, instead of for the detection of primary electrons, for the direct detection of ultraviolet electromagnetic radiation, X-radiation, gamma radiation or particule radiation such as $\alpha$- particles, or ions etc..

In all embodiments of a microchannel plate having rounded channel ends it is possible to enhance the interception on the input of the microchannel plate and to increase the effectivenss of the detection.

The invention furthermore relates to a method of imparting the desired rounded shape to the end of the said microchannels. This method consists in the heating of the microchannel plate to a temperature near the softening temperature of the glass after which the input surface of the microchannel plate is heated by bombardment for a comparatively short period of time by means of an energy-carrying beam of a power in the order of 100 to 200 w/cm$^2$.

The said method means an improvement of a known method of grinding the glass which is described in the magazine "Verres et Refractaires", volume 23, Number 6, pages 693–697, published in November-December 1969.

According to the invention, the microchannel plate of the kind set forth is characterized in that the ends of the walls of the individual channels are rounded.

In addition to the method of obtaining the said rounded shape, the invention also relates to the use of such microchannel plates in image intensifier tubes, photomultiplier tubes, or particle detectors.

A number of preferred embodiments according to the invention will be described in detail hereinafter with reference to the drawing.

Figure 1:
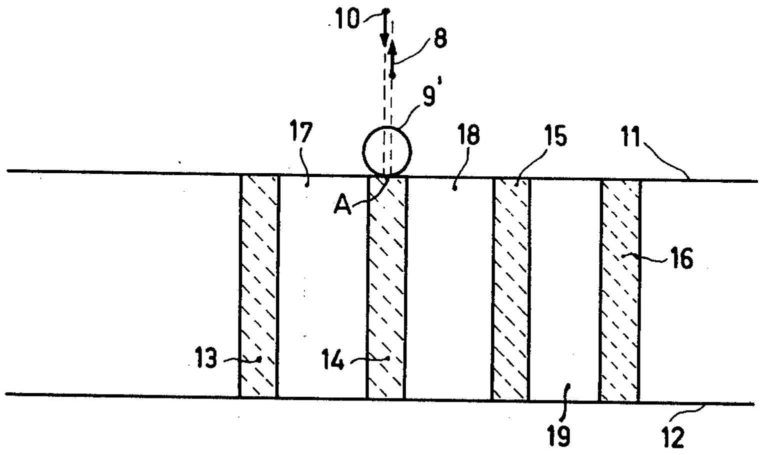
FIG. 1 is a sectional view of a structure of a known microchannel plate.

A channel plate as shown in FIG. 1 comprises an input principal surface 11 and an output principal surface 12 which are connected by channels 17, 18 and 19, having channel walls 13, 14, 15 and 16. The boundaries of these walls coincide with the output surface and the input surface of the microchannel plate.

The end faces of the microchannel plate are both covered with a metal layer (not shown) for the application of an electrical field across the plate.

A primary electron 10 moves, for example, towards the wall 14 and is incident on this wall at a point A. The direction distribution for secondary electrons from the point A is indicated by a circle 9. Due to the interception of an electron at the point A, the probability of secondary electron emission is maximum in the direction perpendicular to the microchannel plate surface 11 at the point A. The electrons emitted in this direction, for example, an electron 8, do not contribute to the intensification.

Figure 2:
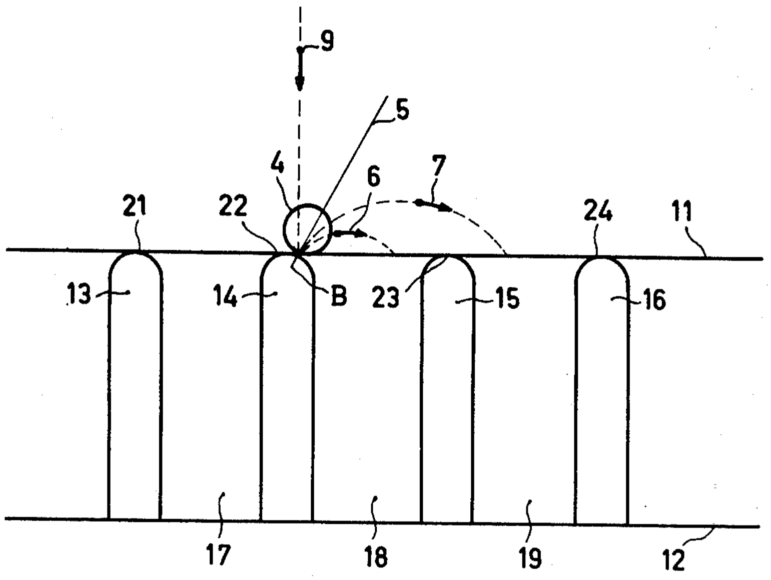
FIG. 2 is a sectional view of a structure of a microchannel plate according to the invention.

In FIG. 2 the walls 13, 14, 15 and 16 on the side of the input surface are rounded such that, cross-sectionally viewed, the ends have the profiles 21, 22, 23 and 24.

An electron 9 collides with the wall 4 at a point B. For this point a circle 4 denotes the secondary emission direction distribution. The probability of emission of secondary electrons is maximum according to a direction 5 which is now inclined with respect to the input surface. Two electrons 6 and 7 emitted in the said direction can be intercepted by the channels 18 and 19 and can thus contribute to the intensification.

For the reasons already described concerning the expansion of the light spot on, for example, a luminescent screen which is generated per channel on the output of the microchannel plate, the resolution of a device including such a channel plate is substantially not reduced, whilst the effectiveness of the detection and the intensification will be higher.

Figure 3:
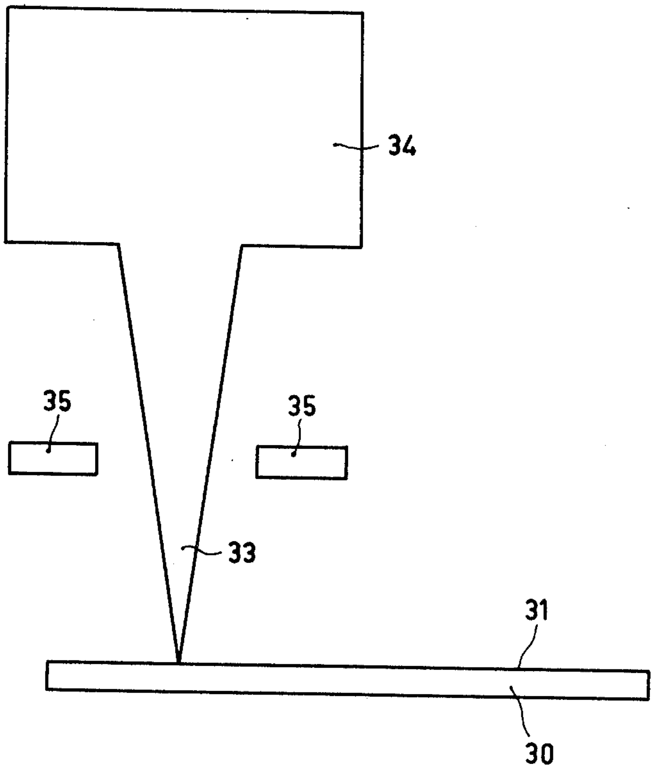
FIG. 3 illustrates the method according to the invention.

FIG. 3 diagrammatically shows an arrangement to illustrate the method of manufacturing such a channel plate. The arrangement is situated in a space (not shown) wherein a vacuum of between, for example, $10^{-5}$ and $10^{-6}$ mm Hg is maintained.

The Figure shows a microchannel plate 30 having flat channel wall ends to be rounded on the input side.

An electron beam 33, supplied by an electron gun 34, for example, of the Pierce type comprising, for example, a focussing coil and coils 35 for deflection of the said electron beam, is focussed on the input surface of the microchannel plate.

Moreover, the said arrangement can comprise a furnace for the preheating of the microchannel plate so as to bring the glass to a temperature in the vicinity of the softening temperature, but slightly therebelow.

The said preheating can also be effected by means of a deconcentrated electron beam.

After termination of the said preheating, the glass has a temperature of, for example, 450° C, whilst the deformation temperature of the glass is approximately 500° C. The surface of the microchannel plate is subsequently scanned by means of a focussed high-power electron beam.

In tests performed on a microchannel plate having a diameter of 25 mm and a thickness of 2 mm, the applied energy amounted to approximately 140 W/cm$^2$, the said power being applied for approximately 0.7 s.

The microchannel plate is subsequentle cooled slowly so as to avoid any thermal shocks.

Under the influence of gravity and the surface stress of the molten glass, the end of the wall of each channel tends to assume a rounded shape. The glass maintains the rounded shape thus obtained during cooling.

According to a further method, the surface heating by electron bombardment is replaced by heating by means of a laser beam, for example, a $CO_2$ laser beam which scans the input principal surface of the microchannel plate.

In the same manner as previously, the assembly formed by the microchannel plate is first brought at a temperature in the vicinity of the softening temperature of the glass, for example, in a furnace.

It is not important what means are used for the surface heating of the microchannel plate, provided that for substantial local heating occurs a comparatively short period of time.

I claim:

1. A method of treating the input face of a glass microchannel plate to enhance radiation interception thereof, comprising the steps of:

heating the input face of the glass microchannel plate to a temperature close to but below the softening temperature of the glass;

bombarding the heated input face of the microchannel plate with an energy-carrying beam of 100 to 200 W/cm$^2$ for a time sufficient to round the input ends of the channel walls of the microchannel plate to enhance radiation interception.

2. A method as defined in claim 1 wherein said time is approximately 0.7 seconds.

3. A method as defined in claim 1 wherein the energy-carrying beam is an electron beam.

4. A method as defined in claim 1 wherein the energy-carrying beam is a laser beam.

* * * * *